United States Patent [19]

Lane, Jr.

[11] Patent Number: 4,700,828
[45] Date of Patent: Oct. 20, 1987

[54] MULTI-CLEVIS CABLE CONNECTOR
[75] Inventor: Wendell C. Lane, Jr., Laurinburg, N.C.
[73] Assignee: Dana Corporation, Toledo, Ohio
[21] Appl. No.: 886,602
[22] Filed: Jul. 18, 1986
[51] Int. Cl.$^4$ ............................................. B65D 85/00
[52] U.S. Cl. .................................... 206/223; 403/300; 403/306
[58] Field of Search ................. 403/300, 306; 206/223

[56] References Cited

U.S. PATENT DOCUMENTS

| | | | |
|---|---|---|---|
| 2,163,677 | 6/1939 | Goeller | 403/300 X |
| 2,233,086 | 2/1941 | Shreffler | 403/300 X |
| 2,598,152 | 5/1952 | Wright et al. | 403/300 X |
| 3,016,272 | 1/1962 | Bean . | |
| 3,084,758 | 4/1963 | Thorner . | |
| 3,114,472 | 12/1963 | Thorner . | |
| 3,132,711 | 5/1964 | McMurray . | |
| 3,153,325 | 10/1964 | Thorner . | |
| 3,551,959 | 1/1971 | Mastalski . | |
| 3,577,787 | 5/1971 | Schmidt . | |
| 3,705,376 | 12/1972 | Kinkaid et al. . | |
| 4,042,305 | 8/1977 | Vincent . | |
| 4,368,562 | 1/1983 | Minami . | |
| 4,543,932 | 10/1985 | Sturdy . | |

Primary Examiner—William Price
Attorney, Agent, or Firm—Richard C. Darr

[57] ABSTRACT

A cruise control servo cable assembly comprising a standard cable including a universal shielded cable end having means at its extremity for attachment to the appropriate one of a set of clevises or adapters provided with the cable assembly. The celvises are of a low cost stamped metal or molded plastic type and are appropriately marked so that by referring to an accompanying chart the installer can select the correct clevis for a particular vehicle and engine option and discard the remaining unused clevises. Means is provided for securely locking the selected clevis to the cable end. The shield encloses the cable end and moves back and forth with the clevis or adapter.

18 Claims, 5 Drawing Figures

MULTI-CLEVIS CABLE CONNECTOR

BACKGROUND OF THE INVENTION

1. Field of the Invention

The present invention relates generally to cable connectors, and more particularly to a multiple-mount clevis construction for speed control throttle cables on automotive vehicles.

2. Description of the Prior Art

Heretofore throttle cables for speed governing systems of automotive vehicles have generally been provided with a single integral clevis end having formed therein a longitudinal slot. The slot is adapted to receive a pin for operatively connecting the cable to the throttle attachment point of the vehicle. Inasmuch as the clevis end is integrally affixed to the throttle cable, and different models of vehicles require cables of different lengths and different clevis configurations, it has been necessary to have available a number of different versions of the cable assembly. In other words, in order to install so-called cruise control systems with the various available combinations of engines and induction systems, it is necessary to provide a number of throttle cable configurations for connecting the cruise control servo mechanism to the throttle attachment point. Such a proliferation of parts merely results in purchasing, inventory control and logistics problems in O.E.M. factory installation, but the matter becomes acute in providing for retrofit installation of cruise control systems at dealerships and garages. In that event the manufacturer must either provide an installation kit including several different cables with each cruise control unit, or employ a universal linkage that can be adapted to fit various units.

In accordance with the latter alternative it has been proposed to interconnect the end of the cable and the throttle hook-up point by means of a length of bead chain or wire rope. The installer then determines the required length for the chain or rope and affixes a suitable connector. Such an arrangement is not entirely satisfactory in that it involves the exercise of judgment on the part of the installer in determining the appropriate length of the chain or rope. Furthermore, there is the possibility of malfunction due to kinking, bending or drooping of the bead chain or wire rope.

For original equipment factory installation there has been provided a so-called shielded clevis design wherein a clevis having an elongated slot therein is affixed by means of a tubular shield and anchor means, to the end of the servo cable. This design offers several advantages over the flexible or universal units including the fact that the elongated slots of the clevis allows the throttle to glide back in non-cruise mode, thereby preventing kinking or bending of the cruise control linkage. The possibility of throttle hang-up due to bead chain or wire rope droop is eliminated, and installation is simplified and made error-proof in that the distance from anchor point to throttle attachment is fixed, so the installer need not determine the length of bead chain or wire rope required.

Such an arrangement is not, however, readily adapted to the retrofit installation of cruise control systems due to the various forms of clevis required for attaching the servo cable at the throttle hook-up point. For example, a single vehicle model supplied in its basic form with a standard four cylinder carbureted engine, may optionally be available with a four cylinder fuel injected or a four cylinder turbo-charged engine, a six cylinder two barrel carbureted or six cylinder fuel injected engine, a performance two barrel V-8 engine, or a high output four barrel V-8 engine. Each engine combination might require a unique clevis arrangement, and thus the after market cruise control manufacturer must either supply the unit in seven separate kits, or include seven cables in a single kit for that one vehicle model. It will thus be apparent that the alternatives are unwieldy and expensive, and there remains a need for a simple, relatively economical, universal means for connecting a cruise control servo cable to a throttle attachment point.

SUMMARY OF THE INVENTION

To that end, there is provided in accordance with the present invention a cruise control servo cable assembly comprising a standard cable including a universal shielded cable end having means protruding at its extremity for attachment to the appropriate one of a set of clevises provided with the cable assembly. The clevises are of a low cost type and are appropriately marked so that by referring to an accompanying chart the installer can select the correct clevis for a particular vehicle engine option and discard the remaining unused clevises.

BRIEF DESCRIPTION OF THE DRAWINGS

In the drawings, wherein like numerals refer to like parts throughout.

DESCRIPTION OF THE PREFERRED EMBODIMENTS

Figure 1:
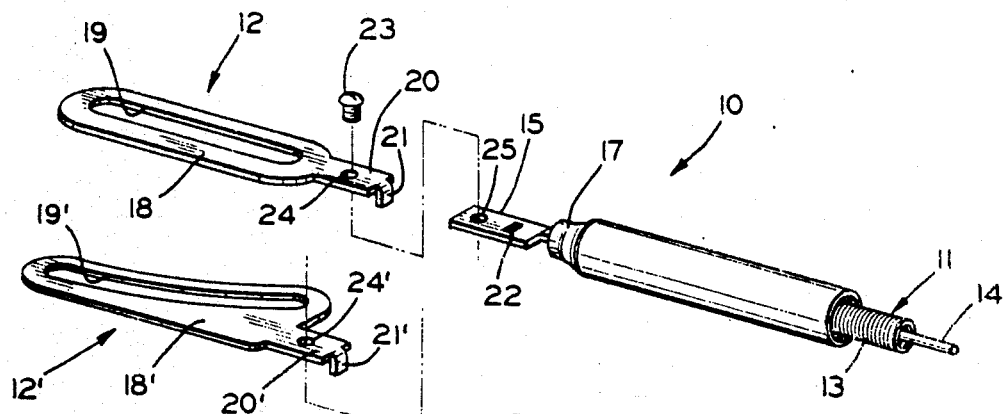
FIG. 1 is an exploded, perspective view of the end of the cruise control servo cable assembly illustrating two alternate forms of clevis, either of which might be affixed to the cable end for connecting the servo cable to a particular throttle hook-up point.
Figure 2:
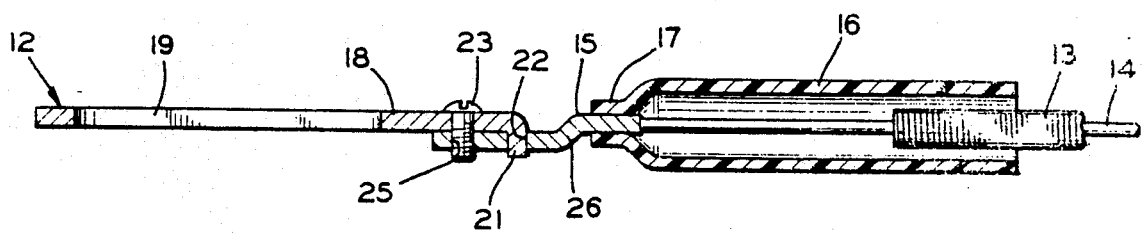
FIG. 2 is a longitudinal sectional view of the shielded cable end with a clevis attached.

Referring now to the drawings, there is shown generally at 10 in FIG. 1 an assembly including the end of a cruise control servo cable and associated throttle hook-up clevises constructed in accordance with the invention. More particularly, the assembly 10 includes a throttle cable 11 connected at one end to a conventional cruise control servo mechanism (not shown) and carrying at its other end the appropriate one of a set of clevises or adapters, two typical clevises of such a set being illustrated generally at 12 and 12', by means of which the cable is connected to the throttle hook-up point of a vehicle engine (also not shown). The throttle cable 11 comprises a flexible, spirally wound sheath 13 within which a control wire 14 is slidably carried in the conventional manner. As best seen in FIG. 2, the control wire has affixed to its end a connecting tab 15. A tubular shield 16 surrounds the end of the flexible sheath 13 and control wire 14, with its end 17 closed around and clampingly engaging the connecting tab 15. The tubular shield thus moves back and forth with the control wire 14 and tab 15 in surrounding relationship to the flexible sheath 13 so as to enclose the end of the sheath and prevent the entry of water and debris which might interfere with operation of the control wire. The tubular shield may, for example, be of molded plastic with its end 17 of a dimension permitting it to be forced over the connecting tab 15 so as to be securely engaged thereto.

As hereinbefore described, there may be provided in accordance with the invention a plurality of the clevises of different configurations and dimensions as necessary and desirable for connecting the servo cable assembly to the throttle hook-up point of any one of a given group of automotive vehicles. Thus, while two such clevises or adapters 12 and 12' have been illustrated in FIG. 1, it will be readily apparent that the clevis may as well be provided in numerous other configurations. Regardless of its specific configuration, the clevis is preferably of inexpensive stamped metal or molded plastic construction. With particular reference to the clevis 12, as will be apparent it includes an elongated plate-like body 18 having formed therein an elongated slot 19 for connecting the servo cable to the throttle hook-up point. A flange 20 projects from the end of the body 18 for connection to the tab 15 affixed to the control wire 14. To that end, the flange 20 is provided at its extremity with a perpendicularly extending shear load tab 21 for insertion into a mating slot 29 in the connecting tab 15 in order to transmit shear forces between the members. A machine screw 23 extends through an opening 24 in the flange 20 and is threaded into an opening 25 in the tab 15 for securely locking the clevis on the connecting tab. The connecting tab 15 is preferably offset at 26, as best shown in FIG. 2, so that the longitudinal axis of the clevis will be aligned with that of the control wire 14 for ease of operation.

The clevis 12' is, of course, generally similar in appearance to the clevis 12 and includes all of the features of the latter. For purposes of simplification, parts of the clevis 12' are identified in the drawings by primed numerals corresponding to their counterparts in the clevis 12. As will be readily apparent, the plate-like body 18 is somewhat wider at the end adjacent the flange 20' to accommodate the curvature of the elongated slot 19'.

Figure 3:
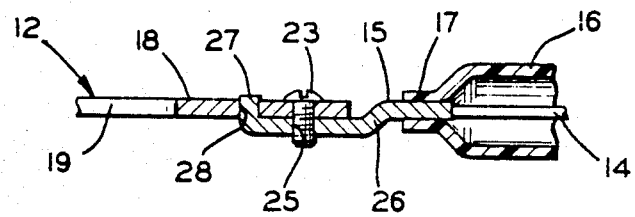
FIG. 3 is a fragmentary sectional view similar to FIG. 2, illustrating an alternate embodiment of the joint between the clevis and the cable end.

The embodiment of FIG. 3 is generally identical to that of FIGS. 1 and 2 except for the location of the shear load tab and associated slot. Thus, in the embodiment of FIG. 3 a shear load tab 27 is provided at the end of the connecting tab 15, and a mating slot 28 is provided in the body 18 for receiving the shear load tab. In all other respects the two embodiments are identical in structure and function.

Figure 4:
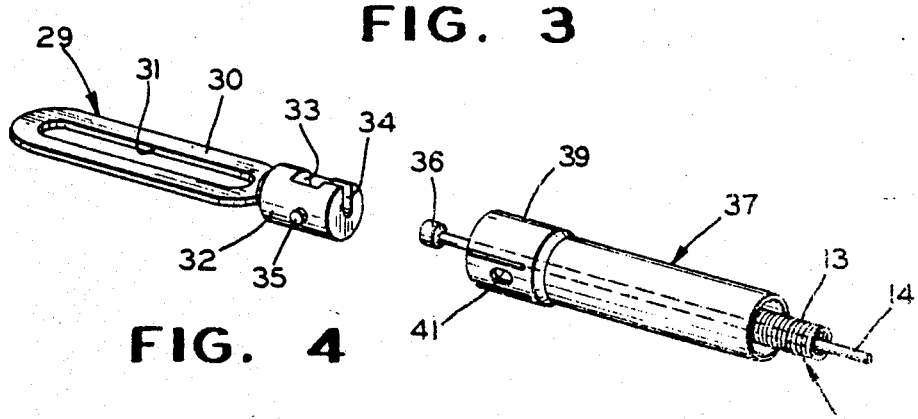
FIG. 4 is a perspective view of an alternate embodiment of the cable end shielded and clevis connection.
Figure 5:
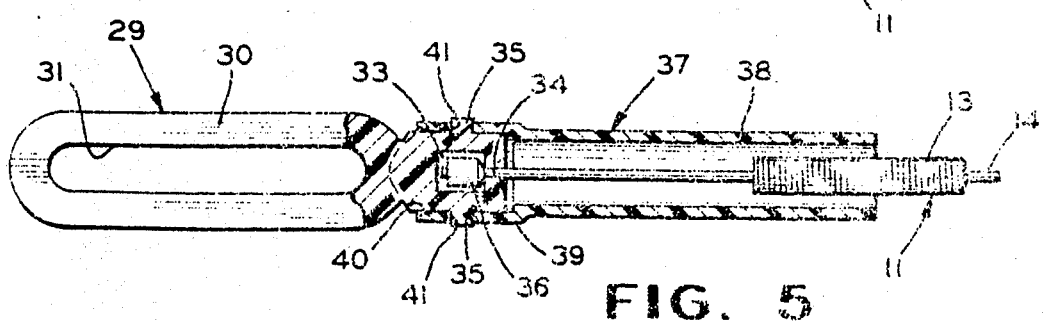
FIG. 5 is a longitudinal view partially in section, of the shielded cable end and attached clevis of the embodiment of FIG. 4.

The embodiment of FIGS. 4 and 5 is particularly adapted to fabrication by plastic molding. Thus the clevises or adapters to be provided with the kit identified generally at 29, each comprise a body 30 having the required shape, with an elongated slot 31 therein for connecting the clevis to the throttle hook-up joint of a vehicle. There is formed at the end of the body 30 a cylindrical head 32 by means of which the clevis is connected to the control wire 14. More specifically, the cylindrical head includes an interior, outwardly opening recess 33 and a slotted passage 34 extending between the recess and the end of the cylindrical head. Outwardly projecting, diametrically opposed ears 35 are provided on either side of the head 32.

A pull slug 36 affixed to the end of the control wire 14 is adapted to be received within the recess 33 as will be hereinafter described for connecting the clevis or adapter 29 to the throttle cable 11. A tubular shield 37 of somewhat different construction from the tubular shield 16 is provided over the end of the flexible sheath 13 and control wire 14 for both locking the clevis to the control wire and preventing debris and water from interfering with operation of the servo cable. To that end, the shield 37 includes a cylindrical body 38 for slidably encircling the flexible sheath 13 and control wire 14 and having a slightly enlarged portion 39 for axially receiving the cylindrical head 32 of the clevis. The interior surface of the enlarged portion 39 flares outwardly adjacent the end as at 40 (FIG. 5) to facilitate insertion of the cylindrical head. The wall of the enlarged portion is further provided with diametrically opposed, slightly longitudinally elongated openings 41 for receiving the ears 35 of the cylindrical head.

As will be readily apparent, in affixing the clevis 29 to the throttle cable 11 in this particular embodiment the tubular shield 37 is retracted to expose the pull slug 36. The pull slug is placed in the recess 33, with the control wire 14 extending through the slotted passage 34, and the tubular shield is then advanced with the enlarged end 39 being forcefully urged over the cylindrical head 32 until the ears 35 snap into the openings 41, thereby locking the throttle cable and clevis together. With the parts thus assembled, the control wire 14 may be advanced and retracted through the flexible sheath 13 and in so doing will correspondingly move the clevis 29 and the tubular shield 37 affixed thereto.

An installation kit embodying the invention will thus include a cruise control throttle cable having one end adapted for connection to the cruise control servo unit, and a number clevises of different configurations and dimensions enabling the cable to be installed on any of a number of automotive vehicles within the group for which the installation kit is designed. The installer merely checks an accompanying chart to determine the correct clevis or adapter to be used with a particular vehicle and engine combination, and then affixes that clevis to the end of the cruise control throttle cable, discarding the remaining inexpensive clevises. Thereafter the clevis may be attached to the throttle hook-up point.

It is to be understood that the forms of the invention herewith shown and described are to be taken as illustrative embodiment only of the same, and that various changes in the shape, size and arrangements of parts may be resorted to without departing from the spirit of the invention.

What is claimed is:

1. A throttle cable comprising a control wire having an end portion, a first connector affixed to said end portion, and a plurality of clevises of differing configurations, each of said plurality of clevises including a second connector, each said second connector being adapted to mate with said first connector whereby any selected one of said plurality of clevises may be affixed to said control wire.

2. A throttle cable as claimed in claim 1, wherein each said clevis comprises a plate-like body with an elongated slot formed therein for connecting said clevis to a throttle hook-up joint.

3. A throttle cable as claimed in claim 1, wherein said first connector includes a tab member and said second connector includes a flange member, one of said tab and flange members including a slot and the other including a shear load tab projecting therefrom for insertion into said slot with said tab and flange in overlapping face-to-face engagement.

4. A throttle cable as claimed in claim 1, including means urging said tab member and said flange member together in said face-to-face engagement for retaining said shear load tab within said slot.

5. A throttle cable as claimed in claim 1, wherein said first connector comprises a pull slug, and said second connector comprises a recess for receiving said pull slug.

6. A kit for coupling a cruise control servo cable to the throttle hook-up point of any of a plurality of vehicles having different predetermined hook-up configurations, comprising a set of clevises, each clevis of said set being adapted for coupling to a different one of said hook-up configurations, a throttle cable including a control wire having a first connector affixed thereto, each clevis of said set including a second connector, and each said second connector being adapted to mate with said first connector whereby any clevis of said set may be affixed to said throttle cable.

7. A kit for coupling a cruise control servo cable as claimed in claim 6, wherein said first connector includes a tab member and said second connector includes a flange member, one of said tab and flange members including a slot and the other including a shear load tab projecting therefrom into said slot with said tab member and flange member in overlapping face-to-face engagement.

8. A kit as claimed in claim 7, including means urging said tab member and said flange member together in said face-to-face engagement for retaining said shear load tab within said slot.

9. A kit as claimed in claim 6, wherein said first connector comprises a pull slug and said second connector comprises a recess for receiving said pull slug.

10. A cruise control servo cable unit adapted for use with automotive vehicles requiring different end configurations for attachment at the throttle hook-up point thereof, comprising a throttle cable having an end portion with a first connecting means affixed thereto, a plurality of clevises of different configurations, each of said clevises having a second connecting means formed thereon adapted to cooperate with said first connecting means to connect said clevis to said throttle cable end portion, one of said plurality of clevises being adapted for attachment at the throttle hook-up point of each of said vehicles requiring said different end configuration, and means securing said first and second connecting means in interconnected relationship.

11. A cruise control servo cable unit as claimed in claim 10, wherein said first connecting means includes a slot and said second connecting means includes a shear load tab adapted to be received in said slot.

12. A cruise control servo cable unit as claimed in claim 11, including means urging said first and second connecting means together with said shear load tab within said slot.

13. A cruise control servo cable unit as claimed in claim 10, wherein said first connecting means includes a shear load tab and said second connecting means includes a slot adapted to receive said shear load tab.

14. A cruise control servo cable unit as claimed in claim 13, including threaded fastener means urging said first and second connecting means together with said shear load tab within said slot.

15. A cruise control servo cable unit as claimed in claim 10, wherein said throttle cable comprises a flexible sheath and a control wire axially moveable therein, and including a tubular shield enclosing said end portion, said tubular shield being affixed to said control wire for movement therewith relative to said flexible sheath.

16. A cruise control servo cable unit as claimed in claim 10, wherein said first connecting means comprises a pull slug affixed to said end portion and said second connecting means includes a recess for receiving said pull slug.

17. A cruise control servo cable unit as claimed in claim 16, wherein said second connecting means comprises a cylindrical head, said recess being formed in said cylindrical head, a slotted passage in said cylindrical head extending from said recess to the end of said head for receiving said throttle cable on which said pull slug is mounted, and a tubular shield surrounding said throttle cable end portion and said cylindrical head for retaining said pull slug within said recess.

18. A cruise control servo cable unit as claimed in claim 17, including at least one ear projecting outwardly from the surface of said cylindrical head, and a mating opening in said tubular shield for receiving said ear to secure said tubular shield against movement relative to said cylindrical head.

* * * * *